US012370109B2

(12) United States Patent
Nail

(10) Patent No.: US 12,370,109 B2
(45) Date of Patent: Jul. 29, 2025

(54) DETACHABLE SIDE RAIL ASSEMBLY FOR A MEDICAL PROCEDURE TABLE

(71) Applicant: Surgix Medical LLC, Spring, TX (US)

(72) Inventor: John Patrick Nail, Bentonville, AR (US)

(73) Assignee: Surgix Medical LLC, Spring, TX (US)

( * ) Notice: Subject to any disclaimer, the term of this patent is extended or adjusted under 35 U.S.C. 154(b) by 91 days.

(21) Appl. No.: 18/428,423

(22) Filed: Jan. 31, 2024

(65) Prior Publication Data

US 2024/0261166 A1 Aug. 8, 2024

Related U.S. Application Data

(60) Provisional application No. 63/444,049, filed on Feb. 8, 2023.

(51) Int. Cl.
*A61G 13/10* (2006.01)
*A61G 13/12* (2006.01)

(52) U.S. Cl.
CPC ....... *A61G 13/101* (2013.01); *A61G 13/1285* (2013.01)

(58) Field of Classification Search
CPC ...... A61G 13/101; A61G 1/052; A61G 13/12; A61G 13/10; A61G 13/1205; A61G 13/1285; A61G 13/128; A61G 13/129; A61G 13/1295; A61G 1/04; A61G 7/00; A61F 5/3769
See application file for complete search history.

(56) References Cited

U.S. PATENT DOCUMENTS

| | | | | |
|---|---|---|---|---|
| 3,104,401 A * | 9/1963 | Davis | A61G 1/04 | 5/406 |
| 5,040,546 A * | 8/1991 | Deluhery | A61B 6/0421 | 378/204 |
| 5,390,383 A | 2/1995 | Carn | | |
| 5,542,423 A * | 8/1996 | Bonutti | A61B 5/4528 | 5/601 |
| 6,023,800 A * | 2/2000 | Stickley | A61G 7/0507 | 5/503.1 |
| 6,195,820 B1 * | 3/2001 | Heimbrock | A61G 13/0045 | 403/68 |
| 6,678,908 B2 * | 1/2004 | Borders | A61G 13/10 | 5/691 |
| 7,100,225 B1 | 9/2006 | Bailey et al. | | |

(Continued)

*Primary Examiner* — Kari K Rodriquez
(74) *Attorney, Agent, or Firm* — Thomas S. Birney; Cochran Freund & Young LLC

(57) ABSTRACT

A detachable side rail assembly has male and female brackets that can be removably secured to opposing sides of a spar of a medical procedure table to facilitate attachment of accessories. The spar has a series of horizontal holes spaced at intervals along its length. The male bracket has a plurality of alignment pins for insertion through selected holes with their ends protruding through the spar. The female bracket is positioned on the opposite side of the spar and has openings to allow the protruding ends of the pins to pass through the female bracket. Keyways in the openings of the female bracket drop into corresponding recesses in the protruding ends of the pins to restrict withdrawal of the pins. A tightening mechanism is employed to exert a tensile force on the pins to removably retain the keyways of the female bracket in the recesses of the alignment pins.

16 Claims, 7 Drawing Sheets

(56) References Cited

U.S. PATENT DOCUMENTS

| | | | | |
|---|---|---|---|---|
| 9,545,351 | B2 | 1/2017 | Sommer et al. | |
| 9,554,959 | B2 | 1/2017 | Carn | |
| 9,750,657 | B2 | 9/2017 | Drake | |
| 10,206,842 | B2 * | 2/2019 | Labedz | A61G 13/0036 |
| 11,744,758 | B2 * | 9/2023 | Lee | A61G 13/08<br>5/621 |
| 2009/0169831 | A1 * | 7/2009 | Malcolm | A61G 13/12<br>428/192 |
| 2012/0126075 | A1 * | 5/2012 | Chinn | A61G 1/04<br>248/221.11 |
| 2018/0000666 | A1 * | 1/2018 | Sirkin | F16M 13/02 |
| 2018/0104120 | A1 * | 4/2018 | Sirkin | A61G 1/04 |
| 2024/0216205 | A1 * | 7/2024 | Kovacs | A61F 5/3776 |

* cited by examiner

DETACHABLE SIDE RAIL ASSEMBLY FOR A MEDICAL PROCEDURE TABLE

RELATED APPLICATION

The present application is based on and claims priority to the Applicant's U.S. Provisional Patent Application 63/444,053, entitled "Detachable Side Rail Assembly For A Medical Procedure Table," filed on Feb. 8, 2023.

BACKGROUND OF THE INVENTION

Field of the Invention

The present invention relates generally to the field of medical procedure tables. More specifically, the present invention discloses a detachable side rail assembly for removably attaching accessories to a medical procedure table.

Background of the Invention

A wide variety of medical procedure tables have been used for many years to support patients undergoing medical procedures, such as surgery. Depending on the type of procedure, the table may be required to support the patient in any of a variety of positions. In addition, the table may be used to support a variety of accessories, such as pads, retractors, armboards, extensions, table top segments, etc., depending on the medical procedure.

Many surgical tables are generally configured as shown for example in FIG. 1 and include a base 12 supporting a number of lift columns 14 at either end of the table 10. The height of each lift column 14 can be independently adjusted to control the elevation, inclination and tilt of the table top. A plurality of parallel table spars 16*a*, 16*b* extend between the ends of the table 10 and are supported by the upper ends of the lift columns 14. These spars 16*a*, 16*b* support the table top and can also be used to removably attach support padding and surgical accessories to the table 10.

The current conventional approach to connect accessories to a table spar is to use a C-shaped clamp that compresses against the top and bottom of the spar. In some instances, a Velcro strap is wrapped around a spar to secure an accessory to the table. However, both of these prior-art approaches require 360 degree access to the spar in the region of attachment, which can interfere with use of the spars to support the table top. In addition, these approaches require time and effort by the medical staff, as well as a degree of care and dexterity to properly attach accessories to table spars.

The present invention provides a detachable side rail assembly that can be readily secured at a desired location along a spar and then used to attach accessories to the table. The side rail assembly can be quickly and easily repositioned on the spar or removed when not required. Further, the present invention does not significantly interfere with other uses of the spars.

SUMMARY OF THE INVENTION

This invention provides a detachable side rail assembly having male and female brackets that can be removably secured to opposing sides of a spar of a medical procedure table to facilitate attachment of accessories at a desired location along the spar. The spar has a series of horizontal holes spaced at intervals along its length. The male bracket can be positioned to abut and extend parallel to a spar. The male bracket has a plurality of alignment pins for insertion through selected holes in the spar with their ends protruding through the spar. The female bracket can be positioned to extend along the opposite side of the spar, and has a plurality of openings to allow the protruding ends of the pins to pass through the female bracket. Keyways in the openings of the female bracket drop into corresponding recesses in the protruding ends of the pins to restrict withdrawal of the pins. A tightening mechanism is then employed to exert a tensile force on the alignment pins to removably retain the keyways of the female bracket in the recesses of the alignment pins. This also fixes a predetermined parallel spacing between the spar and the male and female brackets of the side rail assembly. The side rail assembly can be manually released to reposition it on the spar or remove the side rail assembly.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
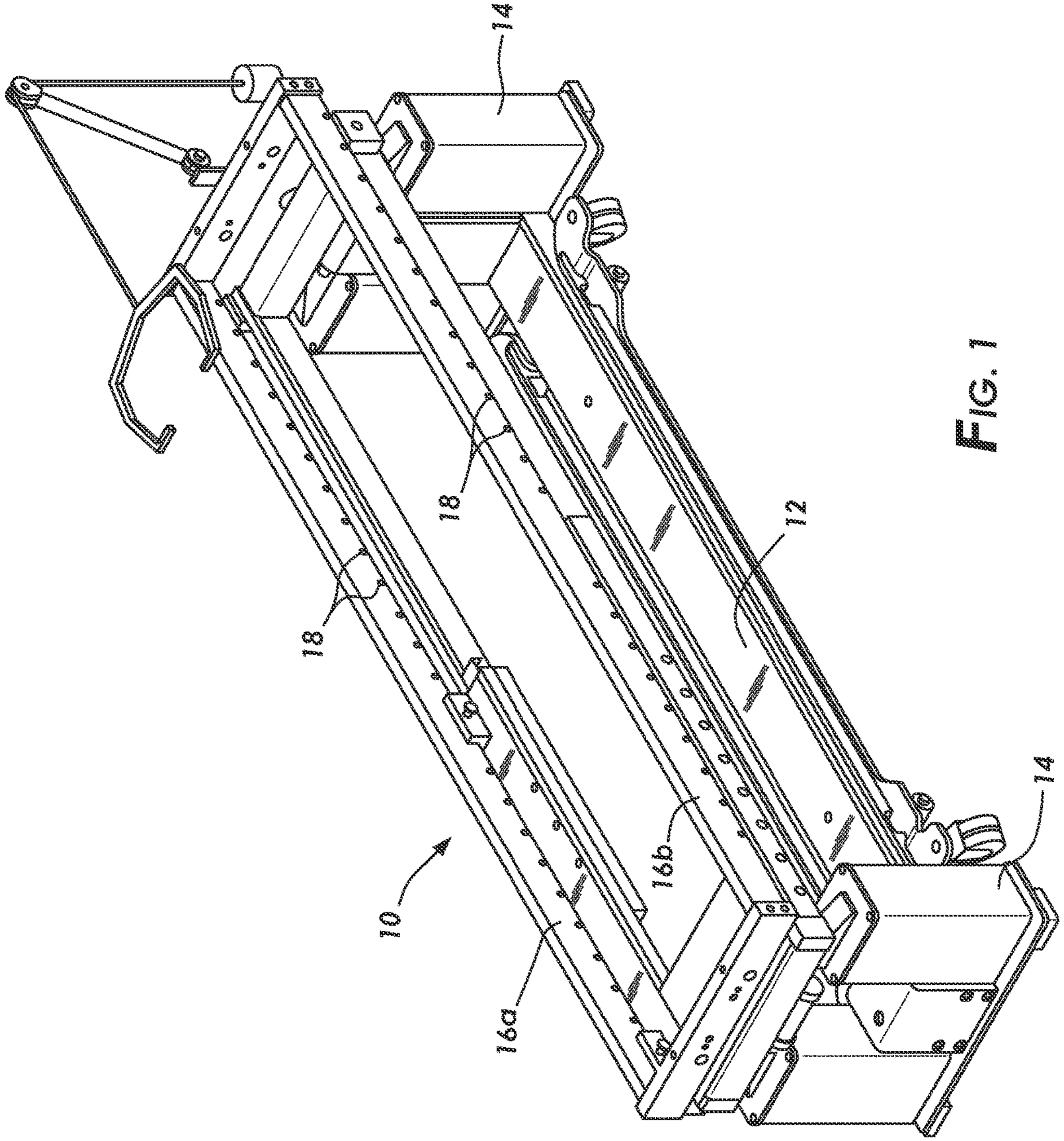
FIG. 1 is an axonometric view of a medical procedure table 10 with table spars 16*a*, 16*b*.

Turning to FIG. 1, an embodiment of the present medical procedure table 10 is shown that includes a base 12 supporting lift columns 14 at either end of the table 10. The height of each lift column 14 can be independently adjusted to control the elevation, inclination and tilt of the table top. A number of parallel table spars 16*a*, 16*b* extend between the ends of the table 10 and are supported by the upper ends of the lift columns 14. A table top can be secured to the spars 16*a*, 16*b* to provide to create a top surface for the table 10. Optionally, a number of smaller modular table top segments can be removably secured over the spars 16*a*, 16*b* to allow customization of the top surface. The table 10 can also be customized by removably attaching accessories to the spars 16*a*, 16*b*.

The term "accessories" should be broadly construed for the purposes of this application to include any type of medical accessory or attachment that can be used in association with a medical procedure table. Examples of such accessories include pads, retractors, armboards, limb extensions and table top segments. In addition, the number, arrangement, type and positions of these accessories can be readily customized to the meet the requirements of each specific patient and medical procedure.

Returning to FIG. 1, at least one of the table spars 16 has opposing sides and a plurality of holes 18 spaced at predetermined regular intervals along the spar 16. These holes 18 extend horizontally through the spar 16 over a range of locations where attachment of accessories may be desired.

Figure 2:
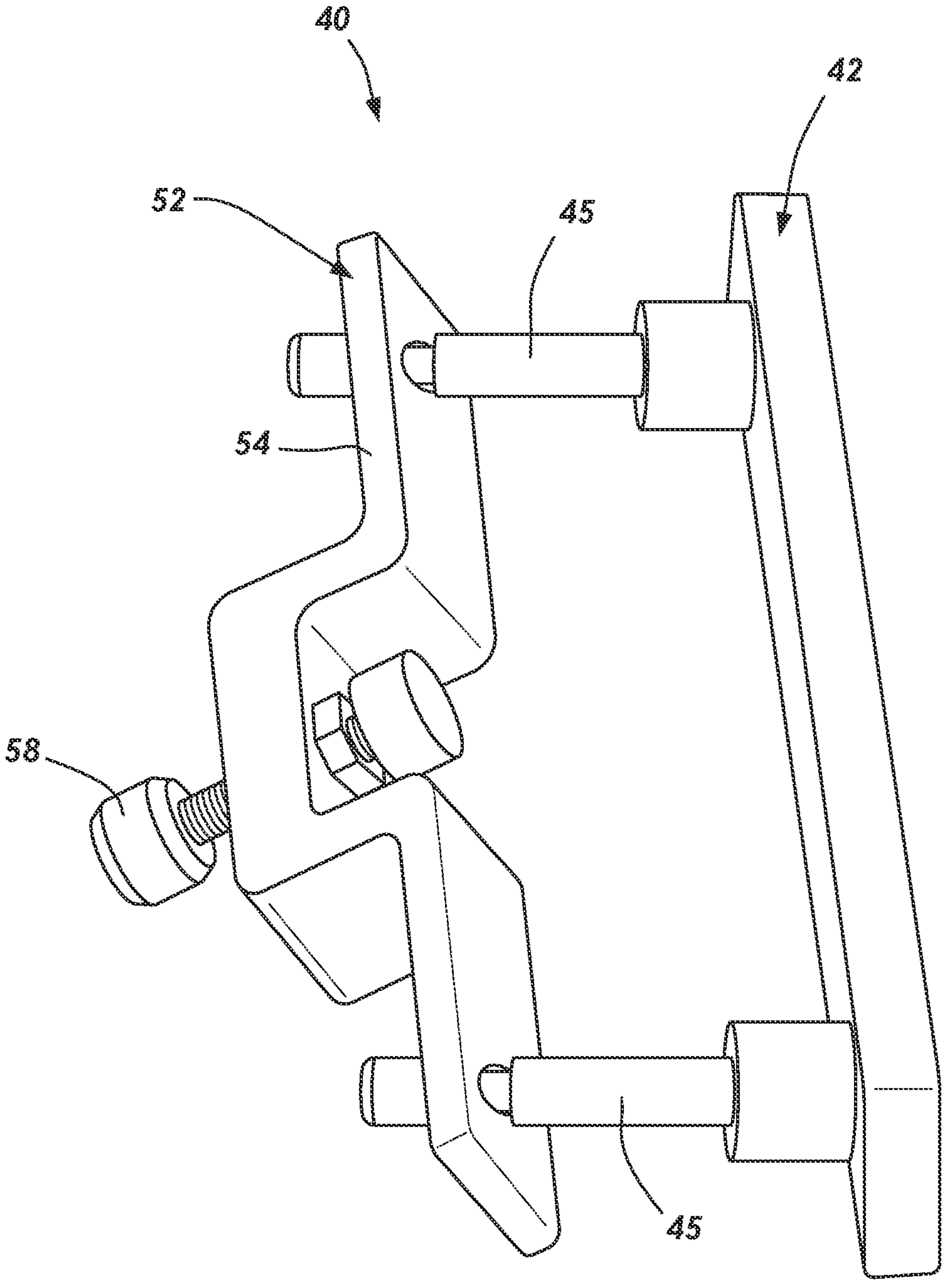
FIG. 2 is a photo showing the male bracket 42 and female bracket 52 of the side rail assembly.
Figure 3:
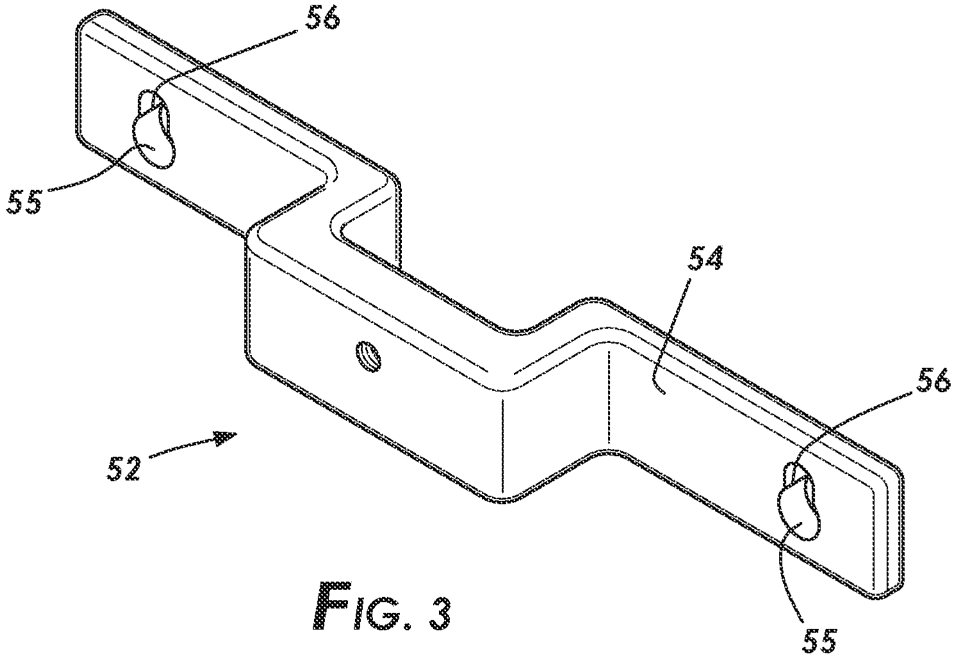
FIG. 3 is an axonometric view of the female bracket 52.

The major components of the side rail assembly 40 are a male bracket 42 and a female bracket 52, as shown in FIGS. 2 and 3. These are manually placed on opposing sides of the spar 16 at a desired location, and then secured to one another and to the spar 16, as will be described below. The completed side rail assembly 40 can then be used to attach accessories to the spar 16 at a desired location along its length.

Figure 5:
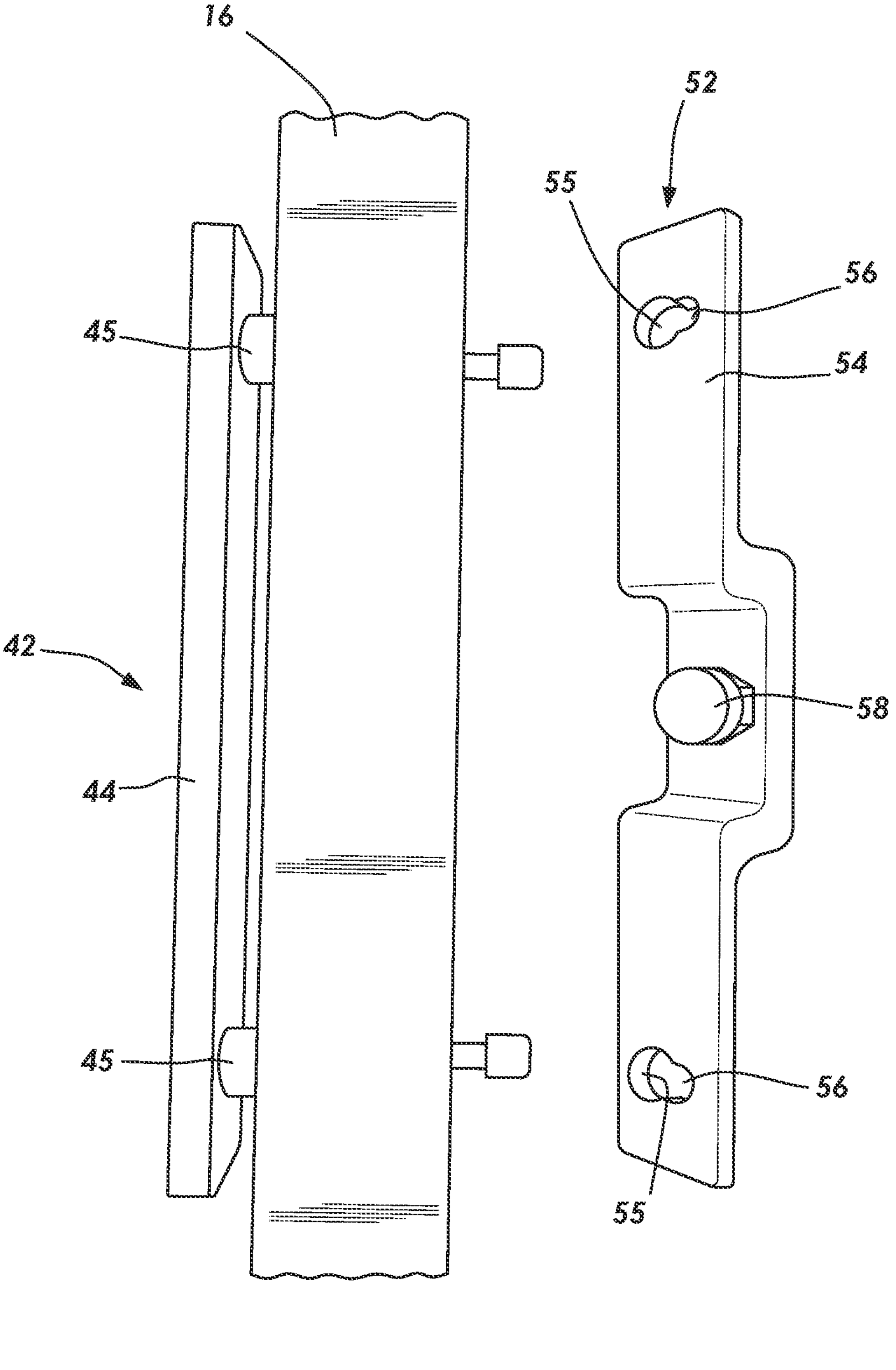
FIG. 5 is a photo showing the alignment pins 45 of the male bracket 42 inserted through the holes in a table spar 16, and the female bracket 52 on the opposite side of the spar.

The male bracket 42 has a horizontal member 44 that can be positioned to abut and extend parallel to the side wall of the spar 16. A number of alignment pins 45 protrude orthogonal to the plane of the horizontal member 44 (i.e., perpendicular to the axis of the spar 16 and parallel to the holes 18 in the spar 16). The distal ends of these pins 45 can be inserted through selected holes 18 in the spar 16 based on the desired position of the side rail assembly 40, as depicted in FIG. 5. The distal ends of the pins 45 also protrude outward beyond the opposite side wall of the spar 16. It should be noted that the distal ends of the alignment pins 45 have a cross-sectional shape and dimensions so that they can freely pass through the holes 18 in the spar 16.

However, the base segment 47 of each alignment pin 45 is too large to enter the holes 18, and instead comes into contact with the adjacent side wall of the spar 16 to act as a spacer between the spar 16 and the horizontal member 44 of the male bracket 42. This maintains a predetermined spacing between the horizontal member 44 of the male bracket 42 and the spar 16 so that accessories can be attached to the horizontal member 44, if necessary.

Figure 4:
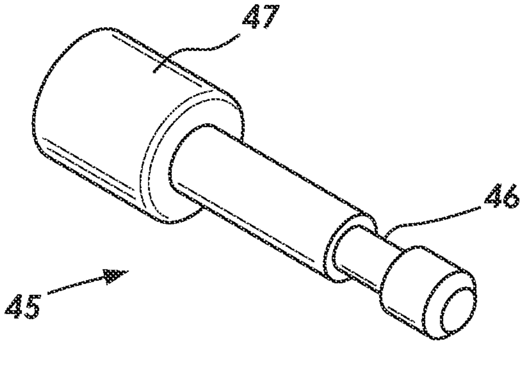
FIG. 4 is an axonometric view of an alignment pin 45 of the male bracket.

In the embodiment of the present invention shown in FIG. 4, each alignment pin 45 includes a substantially annular recess 46 on its protruding distal end at a predetermined uniform distance from the horizontal member 44 of the male bracket 42. This distance is selected so that the annular recesses 46 will be exposed on the distal ends of the alignment pins 45 after they have been inserted through the selected holes 18 in the spar 16. In addition, this distance determines the lateral spacing separating the spar 16 and the female bracket 52 after assembly is complete, as will be described below.

Figure 6:
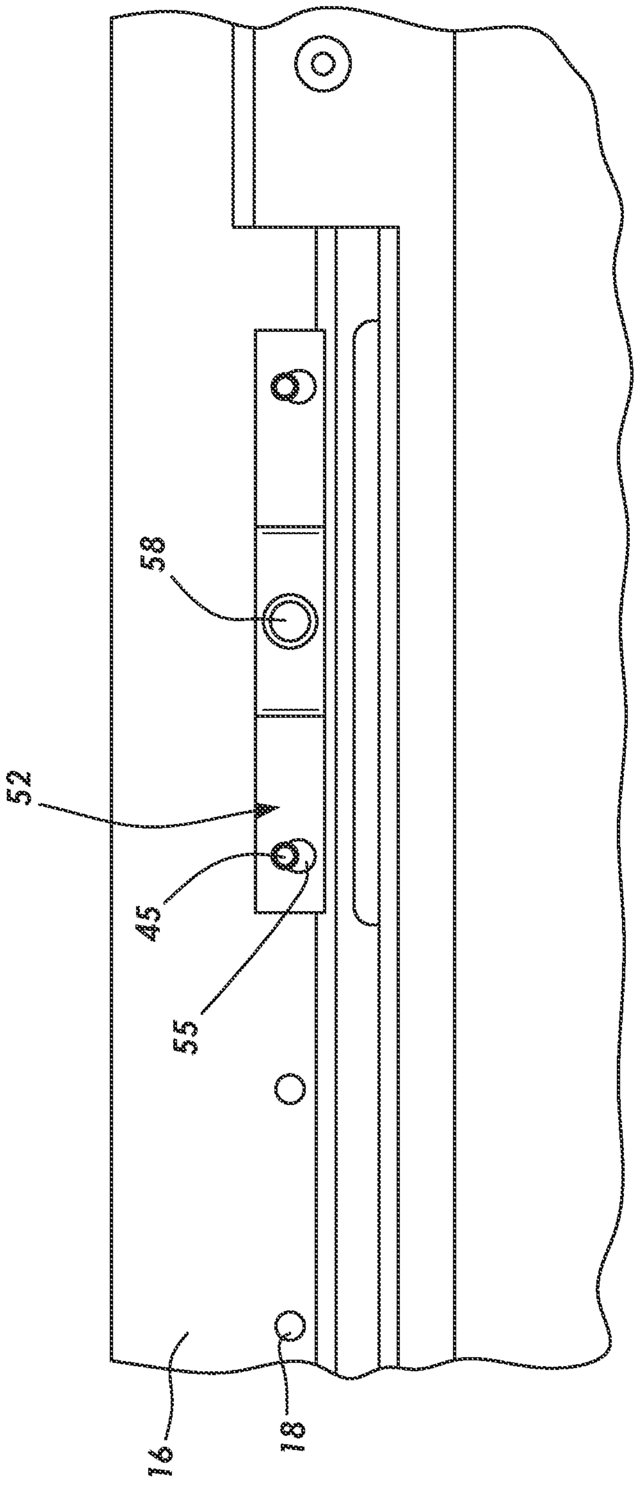
FIG. 6 is a photo showing the female bracket 52 after it has engaged the ends of the alignment pins 45 and the tightening mechanism 58 is being turned.

The female bracket 52 also has a horizontal member 54 extending generally parallel to the opposing side wall of the spar 16. Corresponding openings 55 in the horizontal member 54 allow the ends of the alignment pins 45 to protrude through the female bracket 52 as shown in FIG. 6. Optionally, each opening 55 has a keyway 56 with smaller dimensions on its upper perimeter. The keyway 56 has a shape and dimensions to allow the female bracket 52 to drop into the annular recess 46 of a corresponding alignment pin 45 when the female bracket 52 is pushed over the distal ends of the alignment pins 45. This loosely connects the male and female brackets 42, 52 together, and also serves to fix the lateral spacings between the spar 16 and the male and female brackets 42, 52.

Alternatively, other types of recesses, grooves, channels, enlarged heads, protrusions or holes could be substituted for the annular recesses 46. More generally, all of these alternative embodiments can be viewed as a "catch" to removably engage the distal end of the alignment pin 45 to an opening 55 in the female bracket 52.

After the keyways 56 of the female bracket 52 have been preliminarily seated in the annular recesses 46 of the alignment pins 45, a tightening mechanism 58 is employed to removably retain the alignment pins 45 in the keyways 56 of the female bracket 52, and thereby complete the assembly process by firmly securing the male and female brackets 42, 52 to one another and to the spar 16.

Figure 7:
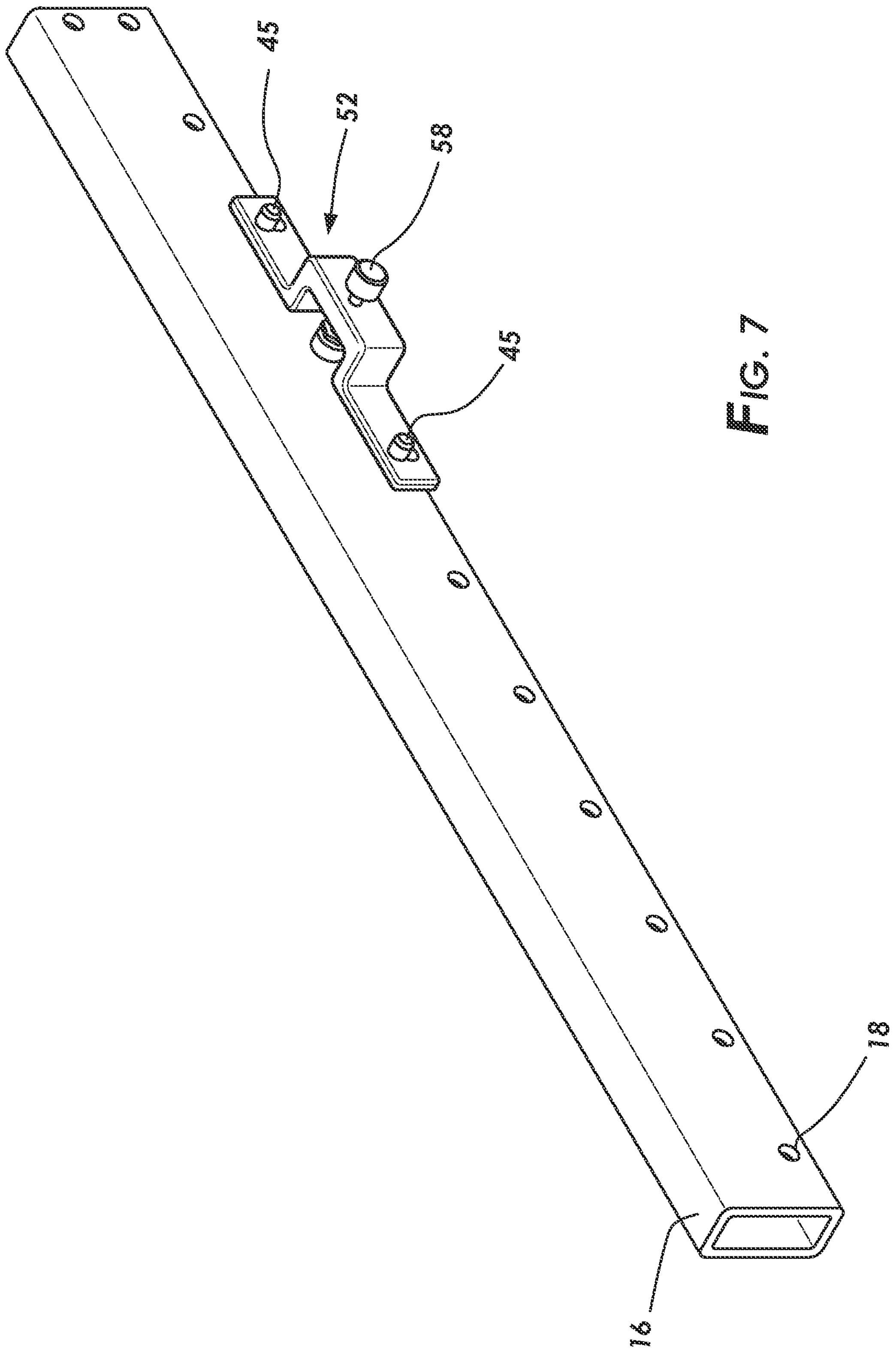
FIG. 7 is an axonometric view of the completed side rail assembly showing the female bracket 52 and a section of a spar 16.
Figure 8:
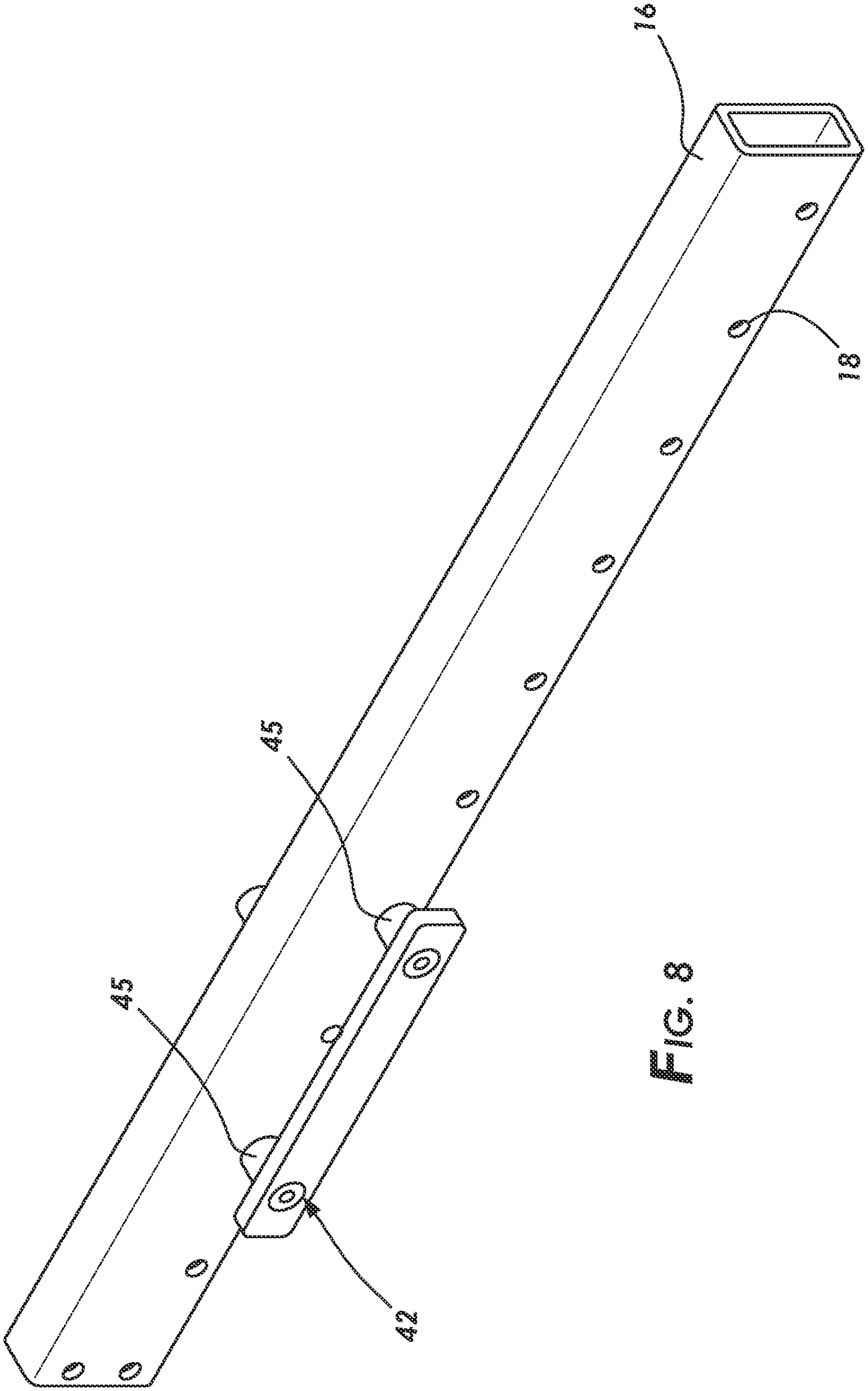
FIG. 8 is an axonometric view of the completed side rail assembly corresponding to FIG. 7 showing the male bracket 42 and a section of a spar 16.

In the preferred embodiment of the present invention, the tightening mechanism 58 is a threaded shaft engaged in a corresponding threaded hole in the mid-section of the female bracket 52. This shaft has a knurled head that can be manually rotated to extend or retract the shaft relative to the female bracket 52, as shown in FIG. 6. As the shaft of the tightening mechanism 58 is extended, its distal tip comes into contact with the side of the spar 16. Further tightening exerts a biasing force pushing against the spar 16 and a resultant tensile force between alignment pins 45 and the female bracket 52. This tension tends to hold the keyways 56 of the female brackets 52 securely in the annular recesses 46 of the alignment pins 45, and thereby secures the male and female brackets 42, 52 and spar 16 together, as illustrated in FIGS. 7 and 8. The lateral separations between the male bracket 42 and the spar 16, and between the female bracket 52 and the spar 16 allow accessories to the attached to either side of the side rail assembly 40, if desired.

Alternatively, other types of tightening mechanisms could be substituted. For example, a spring-loaded member could be used to exert a biasing force against the spar 16. Similarly, a cam mechanism or user-supplied biasing force could also be employed.

The side rail assembly 40 can be readily disassembled by reversing this process. The user first releases the tightening mechanism 58 by loosening the threaded shaft. The keyways 56 of the female bracket 52 can then be lifted out of the annular recesses 46 of the 42, so that the female bracket 52 can be withdrawn from the alignment pins 45.

Preferably, the male bracket 42 of the side rail assembly 40 is placed adjacent to the inside wall of the spar 16 and the distal ends of the alignment pins 45 protrude through the holes 18 to the outside of the spar 16 to simplify assembly. However, this configuration could be reversed so that the female bracket 52 is on the inside of the spar 16 and the male bracket 42 is on the outside of the spar 16.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A medical procedure table comprising:

a base at least one spar supported above the base, having opposing sides and a plurality of holes spaced at predetermined intervals along the spar; and a side rail assembly for removably attaching an attachment to a spar at a desired location, said side rail assembly having:

(a) a male bracket for extending along a side of the spar; said male bracket having a plurality of alignment pins for insertion through selected holes in the spar with distal ends protruding through the holes in the spar, with catches at the distal ends of the alignment pins;

(b) a female bracket for extending along the opposing side of the spar and having a corresponding plurality of openings allowing the protruding ends of the alignment pins to pass through the openings and removably engage the catches to the female bracket; and (c) a tightening mechanism exerting a biasing force against the spar to removably retain the protruding ends of the alignment pins in the openings of the female bracket.

2. The medical procedure table of claim 1 wherein the catches comprise recesses in the protruding ends of the alignment pins, and the corresponding openings in the female bracket include keyways to removably engage the recesses in the protruding ends of the alignment pins.

3. The medical procedure table of claim 2 wherein the recesses in the protruding ends of the alignment pins are substantially annular.

4. The medical procedure table of claim 1 wherein the tightening mechanism further comprises a threaded shaft engaged in a corresponding threaded hole in the female bracket to exert a biasing force on the spar.

5. The medical procedure table of claim 1 wherein the tightening mechanism further comprises a spring-loaded pin extending through the female bracket to exert a biasing force on the spar.

6. The medical procedure table of claim 1 wherein the male bracket further comprises a horizontal member extending parallel to the spar.

7. The medical procedure table of claim 6 wherein the alignment pins further comprise an enlarged base segment adjacent to the horizontal member serving as a spacer between the horizontal member of the male bracket and the spar, thereby allowing accessories to be attached to the horizontal member.

8. A side rail assembly for removably attaching an attachment to a medical procedure table having a base and at least one spar supported above the base with opposing sides and a plurality of holes spaced at predetermined intervals along the spar; said side rail assembly comprising:

a male bracket for extending along a side of the spar; said male bracket having a plurality of alignment pins for insertion through selected holes in the spar with distal ends protruding through the holes in the spar, and recesses on the distal ends of the alignment pins;

a female bracket extending along the opposing side of the spar and having a corresponding plurality of openings allowing the protruding ends of the alignment pins to pass through the female bracket, and having a keyways removably engaging the recesses on the protruding ends in the alignment pin to thereby removably retain the female bracket on the protruding ends of the alignment pins; and a tightening mechanism on the female bracket to exert a biasing force against the spar to removably retain the protruding ends of the alignment pins in the openings of the female bracket.

9. The side rail assembly of claim 8 wherein the recesses in the protruding ends of the alignment pins are substantially annular.

10. The side rail assembly of claim 8 wherein the tightening mechanism further comprises a threaded shaft engaged in a corresponding threaded hole in the female bracket to exert a biasing force on the spar.

11. The side rail assembly of claim 8 wherein the tightening mechanism further comprises a spring-loaded pin extending through the female bracket to exert a biasing force on the spar.

12. The side rail assembly of claim 8 wherein the male bracket further comprises a horizontal member extending parallel to the spar.

13. The side rail assembly of claim 12 wherein the alignment pins further comprise an enlarged base segment adjacent to the horizontal member serving as a spacer between the horizontal member of the male bracket and a spar, thereby allowing accessories to be attached to the horizontal member.

14. A side rail assembly for removably attaching an attachment to a medical procedure table having a base and at least one spar supported above the base with opposing sides and a plurality of holes spaced at predetermined intervals along the spar; said side rail assembly comprising:

a male bracket for extending along a side of the spar and having:

(a) a horizontal member configured to extend parallel to a spar;

(b) a plurality of alignment pins for insertion through selected holes in the spar with: (i) distal ends configured to protrude through said selected holes; (ii) recesses on the distal ends of the alignment pins; and (iii) an enlarged base segment adjacent to the horizontal member configured to serve as a spacer between the horizontal member of the male bracket and the spar; and a female bracket extending along the opposing side of the spar and having a corresponding plurality of openings allowing the protruding ends of the alignment pins to pass through the female bracket, and having keyways removably engaging the recesses on the protruding ends in the alignment pin to thereby removably retain the female bracket on the protruding ends of the alignment pins; and a tightening mechanism on the female bracket to exert a biasing force against the spar to removably retain the protruding ends of the alignment pins in the openings of the female bracket.

15. The side rail assembly of claim 14 wherein the tightening mechanism further comprises a threaded shaft engaged in a corresponding threaded hole in the female bracket to exert a biasing force on the spar.

16. The side rail assembly of claim 14 wherein the tightening mechanism further comprises a spring-loaded pin extending through the female bracket to exert a biasing force on the spar.

* * * * *